No. 788,588. PATENTED MAY 2, 1905.
J. E. MIRANDA.
ICE CREAM MOLD.
APPLICATION FILED JUNE 13, 1904.
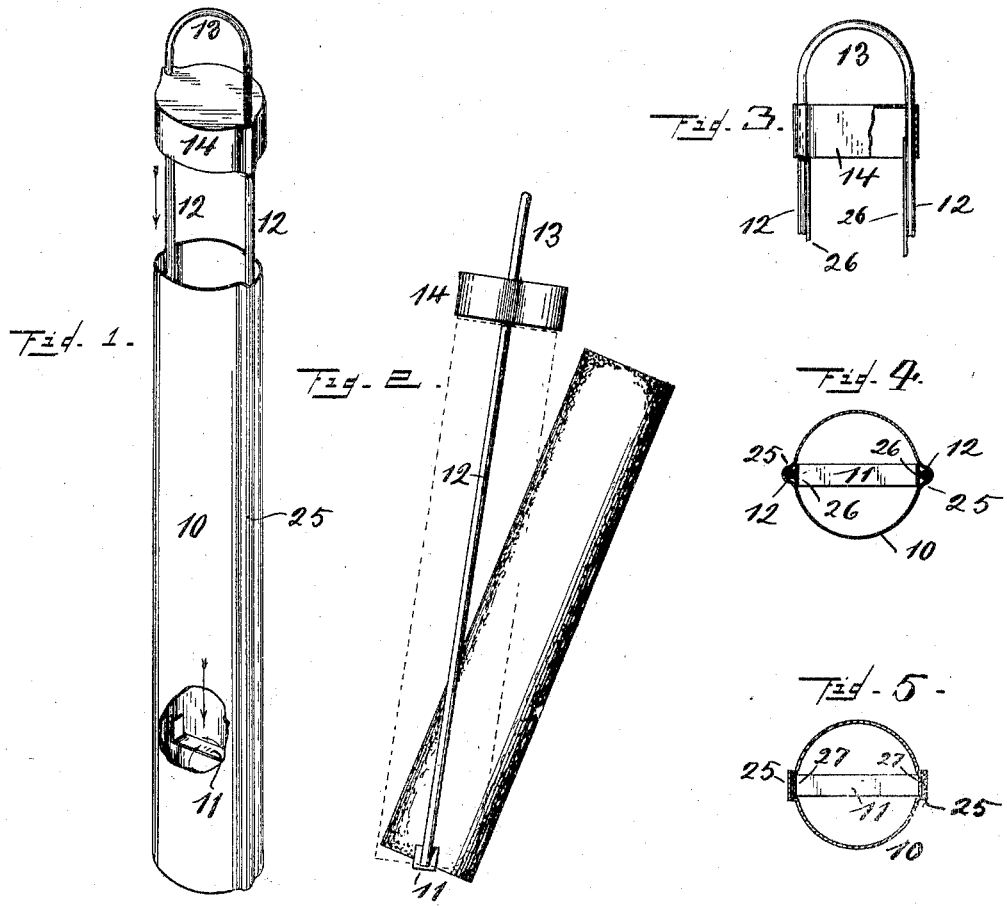
Witnesses
C. Shaw.
Arthur Kline
Inventor
John E. Miranda
by C. Spengel atty No. 788,588.                                                                                      Patented May 2, 1905.

UNITED STATES PATENT OFFICE.

JOHN E. MIRANDA, OF CINCINNATI, OHIO.

ICE-CREAM MOLD.

SPECIFICATION forming part of Letters Patent No. 788,588, dated May 2, 1905.

Application filed June 13, 1904. Serial No. 212,373.

*To all whom it may concern:*

Be it known that I, JOHN E. MIRANDA, a citizen of the United States, residing in the city of Cincinnati, in the county of Hamilton and State of Ohio, have invented a certain new and useful Ice-Cream Mold; and I do declare the following to be a clear, full, and exact description thereof, attention being called to the accompanying drawings, with the reference characters marked thereon, which form also a part of this specification.

This invention relates in general to means for producing frozen confections—like ice-cream, for instance—in solid blocks of certain shapes.

It relates more particularly to the mold which receives the prepared liquid or semi-liquid mass to be congealed and which are arranged to permit them after charged to be exposed to and acted upon by a refrigerating agent for the purpose of freezing the contents into a solid mass and to the means whereby the frozen contents are withdrawn from the mold.

The invention consists of the means and devices and their construction as the same, together with their operation, are hereinafter described and claimed and as illustrated in the accompanying drawings, in which—

Figure 1 shows in perspective view a mold constructed as contemplated by my invention, the same being shown open with the means for extracting the contents in an intermediate position. Fig. 2 shows these means withdrawn and used to extract a frozen block or stick, this latter being partly detached from the extracting means. Fig. 3 shows the upper part of the withdrawn extractor slightly modified and with the lid of the mold attached and partly broken away. Fig. 4 shows a horizontal section of the mold and the extractor, as shown in Fig. 3. Fig. 5 is also a horizontal section of the mold and shows another modification of the extractor.

10 is the body of the mold, preferably of cylindrical shape, although other shapes, as prismatical and square or polygonal, are not excluded. This body is by preference imperceptibly flared toward its open mouth to facilitate withdrawal of the contents. For such withdrawal an extractor is used, consisting of a bar 11, extending across the bottom of the mold when inserted, but of smaller area than the bottom. This cross-bar is supported at the lower ends of two links 12, which by preference are formed of one continuous piece of wire and together extend through the entire depth of the mold and project above the same, where they form a handle or bail 13, whereby the extractor is manipulated. They between them support also the lid 14 of the mold, which is attached to them, as best shown in Fig. 3, and fitted to close the mold liquid-tight. The object of the reduced width of cross-bar 11 is to permit insertion of the extractor and passage of it through the contents of the mold, these latter being filled before the extractor is inserted. The contents in this case are supposed to be the usual liquid ice-cream mixture of milk and cream, sugar, and other sweetening and flavoring extracts. Bar 11 when the extractor is inserted readily passes through this mass, the part displaced by it readily passing up through the open space on either side. The molds after being filled are placed in a suitable freezer adapted to contain a freezing mixture which surrounds the mold. After their contents are frozen they are withdrawn one by one and the frozen sticks are extracted from them. For such purpose a hold is taken at the upper end 13 of the extractor, and this latter is pulled out of the mold. The mass being now solid, the narrow bar 11 readily carries the same up. After out of the mold the frozen block is readily detached sidewise, as best shown in Fig. 2. In order to preserve a smooth surface of these blocks and also to prevent the mass from freezing around links 12, these latter are contained and move in recesses 25, formed in the side of the mold. The extractor in its construction may be slightly modified. As shown in Figs. 1 and 2, the links consist simply of wire.

In Figs. 3 and 4 cross-bar 11 in shape of a narrow strip of tin 26 is also carried up on the inner side of the wire.

In Fig. 5 the wire is entirely omitted and the entire extractor is formed of a flat strip of tin 27.

Having described my invention, I claim as new—

1. A mold for freezing ice-cream in sticks, consisting of the cylindrical mold-body proper, an extractor extending, when inserted, diametrically across the bottom of the same, so as to cover only a limited portion thereof and leaving the larger part on either side uncovered and a link at each end of it extending upwardly along lines diametrically opposite on the inside of the cylinder and projecting above the upper edge of the same, whereby the extractor may be withdrawn.

2. A mold for freezing ice-cream in sticks, consisting of the mold-body proper, an extractor extending, when inserted, across the bottom of the same, links whereby the extractor is supported at each end and whereby it may be withdrawn and recesses provided in the side of the mold into which these links are fitted and wherein they move so as not to project beyond the surface of the side.

3. A mold for freezing ice-cream in sticks, consisting of the mold-body proper, an extractor extending, when inserted, across the bottom of the same, but of smaller area than this latter, links extending to the outside of the mold where they form a handle and a cover for the mold fitted to close the same attached to and supported between these links.

4. A mold for freezing ice-cream in sticks, consisting of the mold-body proper, an extractor extending, when inserted, across the bottom of the same, but of smaller area than this latter, links at each end of the same extending to the outside of the mold where they form a handle, recesses provided in the side of the mold into which these links are fitted and wherein they move and a cover for the mold fitted to close the same, attached to and supported between these links.

5. A mold for freezing ice-cream in sticks, consisting of the mold-body proper, an extractor extending, when inserted, across the bottom of the same, links to manipulate the extractor extending to the outside from the edge of the extractor, being connected thereto at points diametrically opposite and a cover for the mold fitted to close the open end thereof and attached to and carried between these links.

In testimony whereof I hereunto set my signature in the presence of two witnesses.

JOHN E. MIRANDA.

Witnesses:
   C. SPENGEL,
   ARTHUR KLINE.